(12) United States Patent
Enzinna

(10) Patent No.: US 6,289,759 B1
(45) Date of Patent: Sep. 18, 2001

(54) LOW COST ELECTRIC ACTUATOR WITH SELF-ALIGNING FEATURE

(75) Inventor: Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/499,257

(22) Filed: Feb. 7, 2000

(51) Int. Cl.⁷ ............................... F16H 1/16; F16H 1/20
(52) U.S. Cl. ................... 74/425; 74/416; 74/409
(58) Field of Search ................ 74/425, 409, 402, 74/416, 412 R

(56) References Cited

U.S. PATENT DOCUMENTS

| | | | |
|---|---|---|---|
| 5,613,402 | * 3/1997 | Gauger et al. | 74/425 |
| 5,777,411 | * 7/1998 | Nakajima et al. | 310/83 |
| 6,085,368 | * 7/2000 | Robert et al. | 5/85.1 |

FOREIGN PATENT DOCUMENTS 61-211558 * 9/1986 (JP).

* cited by examiner

Primary Examiner—David Fenstermacher
(74) Attorney, Agent, or Firm—Patrick M. Griffin

(57) ABSTRACT

An actuator assembly for actuating a valve assembly having a shaft is provided. The actuator assembly includes a mounting member having a hole therethrough and a first attachment member. A first gear has a portion that extends through the hole for actuating the valve assembly. The actuator assembly also includes an actuator for driving the first gear. A second gear is interposed between the actuator and the first gear with the second gear coupled to the first gear. A carrier has a second attachment member for slidably engaging the first attachment member and securing the carrier to the mounting member. The carrier includes a cradle portion that supports the actuator and a bearing portion that supports the first gear when the carrier and mounting member are in an assembled position. In the assembled position, the cradle aligns the first and second gears with one another.

18 Claims, 3 Drawing Sheets

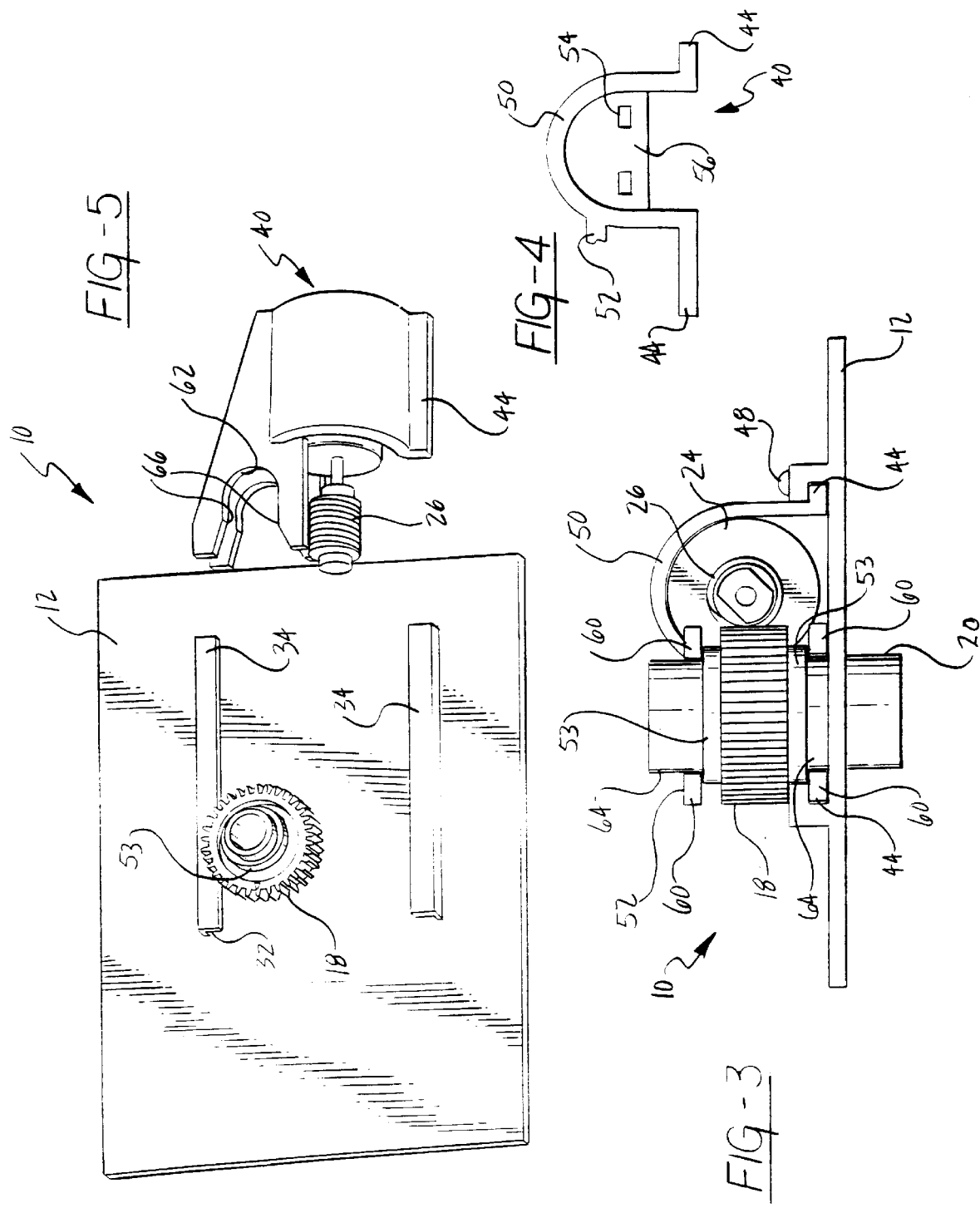

LOW COST ELECTRIC ACTUATOR WITH SELF-ALIGNING FEATURE

TECHNICAL FIELD

This invention relates to an actuator assembly for a valve assembly used in HVAC systems, and more specifically, the invention relates to a cradle and attachment members for aligning the actuator assembly.

BACKGROUND OF THE INVENTION

Actuator assemblies are used to open and close valve assemblies in HVAC systems, such as a film or flap valve, to regulate the flow of air through the ducts of a vehicle. The actuator assemblies include an electric motor and gear set enclosed by a plastic case. Typically, the gear set includes a driven gear that is coupled to a shaft in the valve assembly. A drive gear is secured to the electric motor and is coupled to the driven gear to actuate the valve. The case has two-halves that are held together by snaps or threaded fasteners which cooperate to align the gears and actuator relative to one another to ensure proper operation with the actuator assembly. Prior art actuator assemblies utilize many components to support the actuator and gears and align them with one another. Therefore what is needed is a low cost actuator assembly that reduces the number of components without compromising the function of the actuator assembly.

SUMMARY OF THE INVENTION

The present invention provides an actuator assembly for actuating a valve assembly having a shaft. The actuator assembly includes a mounting member having a hole therethrough and a first attachment member. A first gear has a portion that extends through the hole for actuating the valve assembly. The actuator assembly also includes an actuator for driving the first gear. A second gear is interposed between the actuator and the first gear with the second gear coupled to the first gear. A carrier has a second attachment member for slidably engaging the first attachment member and securing the carrier to the mounting member. The carrier includes a cradle portion that supports the actuator and a bearing portion that supports the first gear when the carrier and mounting member are in an assembled position. In the assembled position, the cradle aligns the first and second gears with one another.

Accordingly, the present invention provides a low cost actuator assembly that reduces the number of components without compromising the function of the actuator assembly.

BRIEF DESCRIPTION OF THE DRAWINGS

FIG. 3 is an end view of the actuator assembly shown in FIG. 1;

FIG. 4 is a cross-sectional view of a carrier of the present invention taken along line 4—4 in FIG. 2;

FIG. 5 is a top perspective view of the actuator assembly shown in FIG. 1 prior to assembly;

DESCRIPTION OF THE PREFERRED EMBODIMENT

Figure 1:
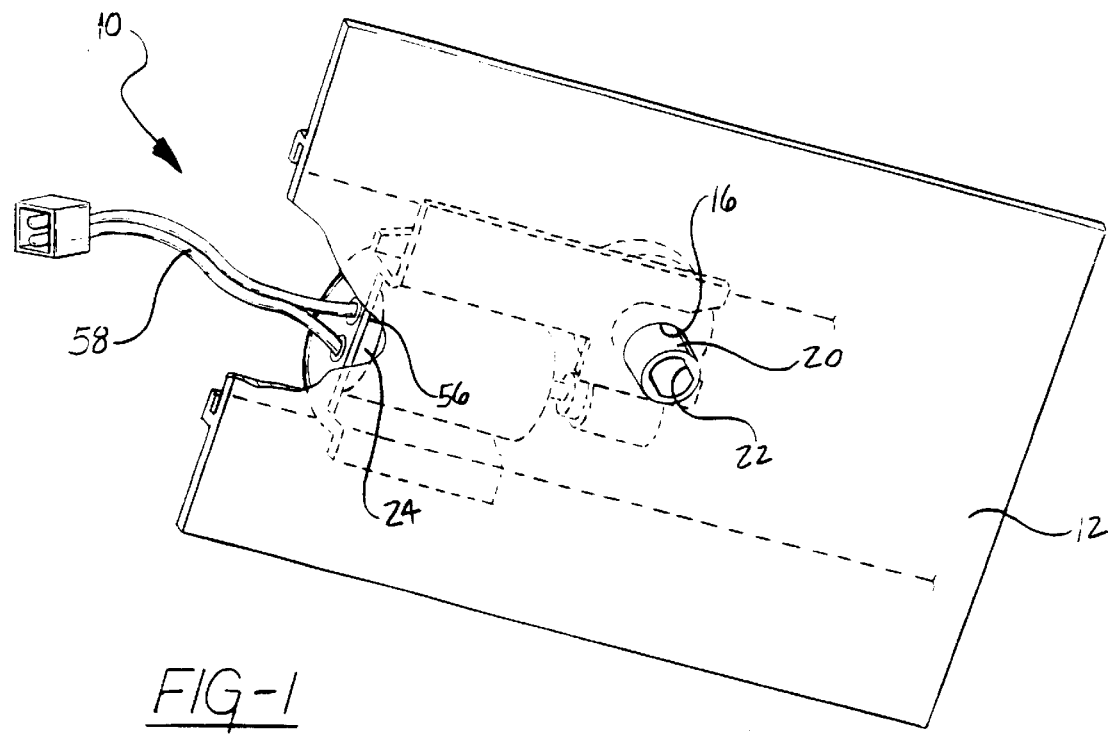
FIG. 1 is a bottom perspective view of the present invention actuator assembly in an assembled position.
Figure 2:
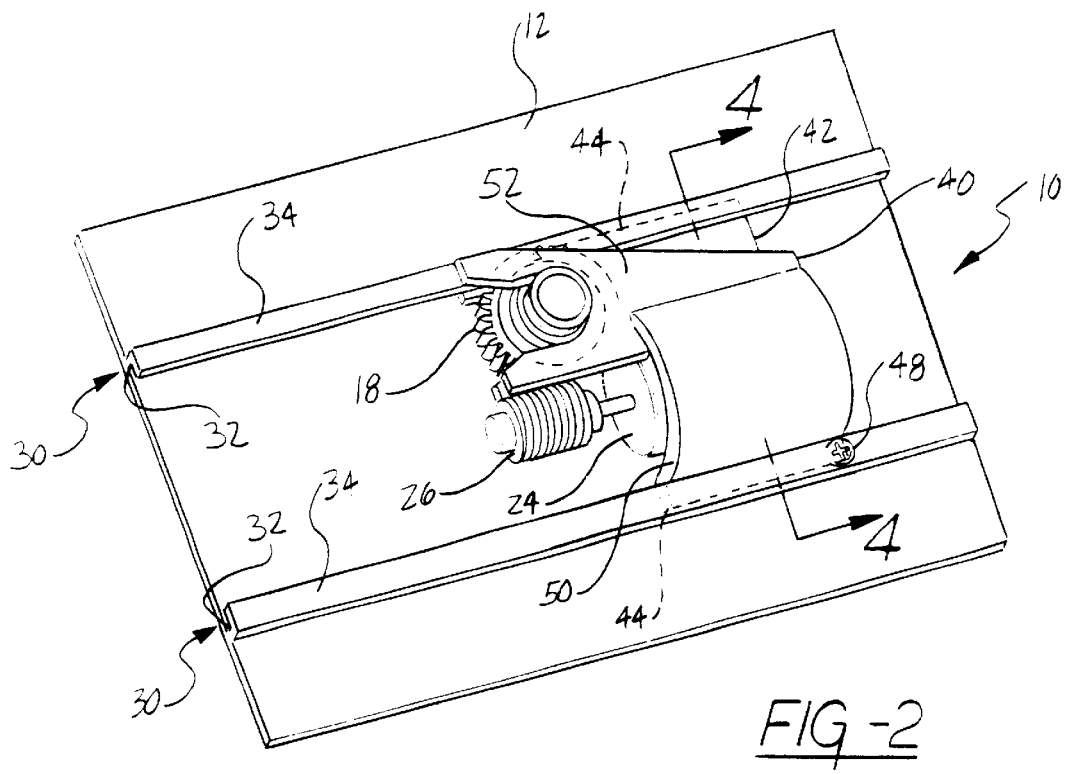
FIG. 2 is a top perspective view of the actuator assembly shown in FIG. 1.

An actuator assembly 10 for actuating a valve assembly having a shaft is shown in the Figures. Actuator assembly 10 may be used to actuate a flap valve, film valve, or any other HVAC valve assembly. Referring to FIGS. 1 and 2, actuator assembly 10 includes a mounting member 12 preferably, a HVAC case. However, mounting member 12 may be a vehicle component having the inventive attachment features discussed below. Mounting member 12 has a hole 16 therethrough for receiving a first gear 18. Specifically, first gear 18 has a portion 20 extending through hole 16 for actuating a valve assembly. Portion 20 may have a recess 22, as shown, for receiving a complementary shaped end of a valve assembly shaft, or portion 20 may be integrally formed with the valve assembly shaft.

An actuator 24, preferably a DC motor, supports a second gear 26 that drives first gear 18. In the preferred embodiment, first 18 and second 26 gears are coupled directly to one another. Second gear 26 is preferably a worm that drives first gear, or worm gear, 18. Of course it is to be understood that any number or any type of gears, such as spur gears, may be used with the present invention.

Figure 6:
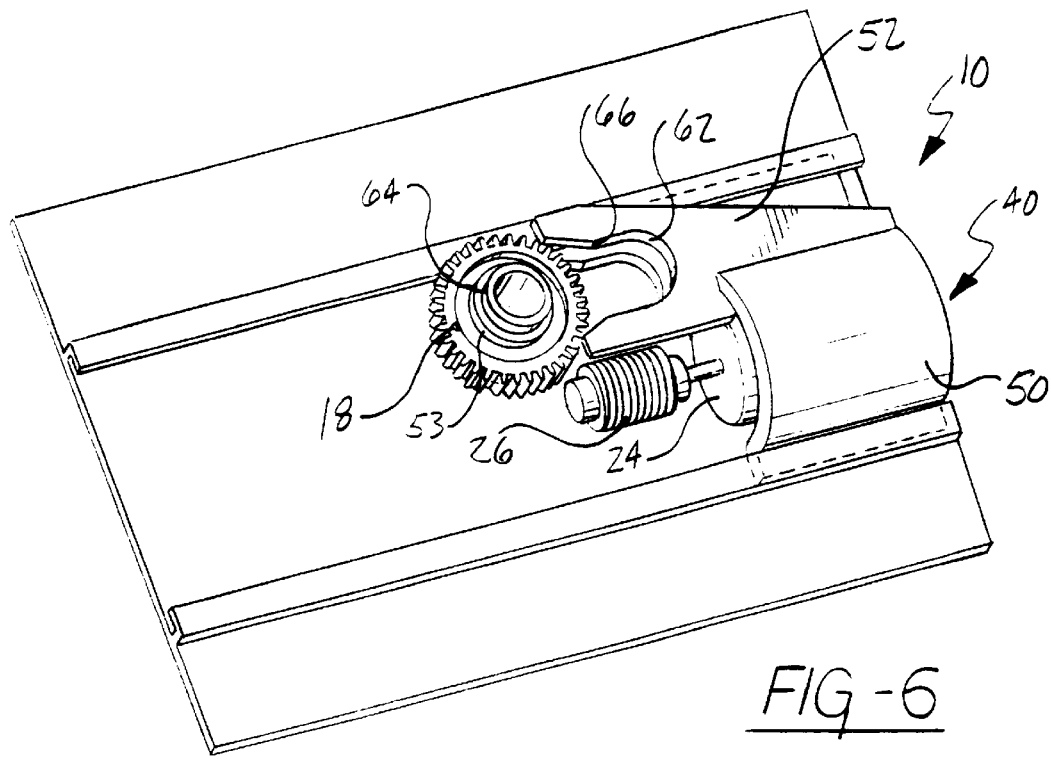
FIG. 6 is a top perspective view of the actuator assembly shown in FIG. 5 prior to first and second gears engaging one another during assembly.
Figure 7:
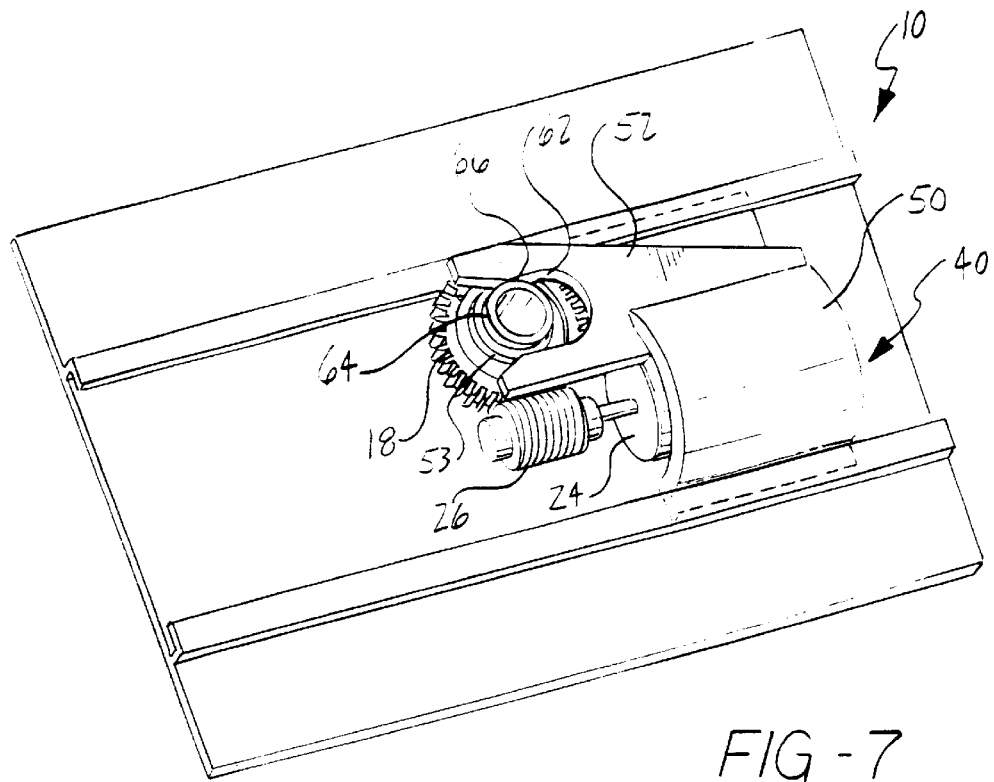
FIG. 7 is a top perspective view of the actuator assembly shown in FIG. 5 with first and second gears engaging one another during assembly.

Mounting member 12, which is preferably manufactured from an inexpensive material such as talc filled polypropylene, has a first attachment member 30. First attachment member 30 includes a pair of parallel grooves 32 formed by opposing L-shaped flanges 34 extending from the surface of mounting member 12. The flanges 34 may be any suitable length or spacing. FIGS. 2, 6 and 7 depict flanges 34 that extend the entire length of the mounting member 12 while FIG. 5 depicts much shorter flanges 34. Hole 16 is interposed between parallel grooves 32. A carrier 40 has a second attachment member 42 that includes a pair of parallel tongues 44 for slidably engaging parallel grooves 32 and securing carrier 40 to mounting member 12. Preferably, carrier 40 is manufactured from a structurally stable material such as a glass filled polycarbonate.

A retainer 48, such as a fastener, coacts with mounting member 12 and carrier 40 for preventing relative movement between mounting member 12 and carrier 40. Fastener 48 may be received in an aperture in mounting member 12 in abutting relationship with carrier 40. Of course, any suitable retaining mechanism may be used. For example, a depressible detent may be molded into the mounting member 12 that deflects as the carrier 40 is slid into place and then returns to retain the carrier 40.

Carrier 40 includes a cradle portion 50 that supports actuator 24 and a bearing portion 52 that supports first gear 18 when carrier 40 and mounting member 12 are in an assembled position (shown in FIGS. 2 and 3). The first gear 18 may also include steps 53 that acts as a bearing surface on bearing portion 52. In the assembled position, carrier 40 aligns first 18 and second 26 gears with one another. The dimensionally stable material of carrier 40 ensures that gears 18 and 26 are properly aligned throughout various operating conditions, such as fluctuations in temperature. Referring to FIGS. 1 and 4, actuator 24 includes electrical contacts, or prongs, as well known in the art. Carrier 40 includes receptacles 54 on a rear wall 56 for receiving the electrical contacts. A wire connector 58 is connected to receptacles 54 for providing power to actuator 24. Alternatively, the connector 58 may be molded integrally with the carrier 40.

Referring to FIG. 5, bearing portion 52 includes spaced apart legs 60 having C-shaped apertures 62 aligned with one another. First gear 18 has a shaft portion 64 that is received in apertures 62, which are tapered to facilitate receiving shaft portion 64 during installation of carrier 40 onto mounting member 12, as shown in FIGS. 6 and 7. A portion of a tongue 44 forms one leg 60. Apertures 62 have a narrow portion 66 in which the gap between legs 60 is smaller than the diameter of shaft portion 66 for retaining shaft portion 64 of first gear 18. Shaft portion 66 is snap-fit into apertures 62 when in the assembled position. First gear 18 rotates as worm 26 engages first gear 18 during installation of carrier 40.

The actuator assembly of the present invention provides a unitary carrier assembly that provides electrical receptacles and supports the electric motor and gears in proper alignment with the integrally formed cradle and bearing portions. In this manner the number of components is greatly reduced.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An actuator assembly for actuating a valve assembly having a shaft, said actuator assembly comprising:
   a mounting member having a hole therethrough and a first attachment member;
   a first gear having a portion extending through said hole for actuating the valve assembly;
   an actuator for driving said first gear;
   a second gear interposed between said actuator and said first gear with said second gear coupled to said first gear; and
   a carrier having a second attachment member for slidably engaging said first attachment member and securing said carrier to said mounting member, said carrier including a cradle portion supporting said actuator and a bearing portion supporting said first gear when said carrier and mounting member are in an assembled position in which said cradle aligns said first and second gears with one another.

2. The assembly as set forth in claim 1 wherein said one of said first and second attachment members is a tongue and the other of said first and second attachment members is a groove.

3. The assembly as set forth in claim 2 wherein said first attachment member comprises a pair of parallel grooves and said second attachment member comprises a pair of parallel tongues.

4. The assembly as set forth in claim 3 wherein said hole is interposed between said parallel grooves.

5. The assembly as set forth in claim 2 further comprising a retainer coacting with said mounting member and said carrier for preventing relative movement between said mounting member and said carrier.

6. The assembly as set forth in claim 5 wherein said retainer comprises a fastener received in said mounting member and in abutting relationship with said carrier.

7. The assembly as set forth in claim 1 wherein said second gear is supported by said actuator.

8. The assembly as set forth in claim 7 wherein said second gear is a worm and said first gear is a worm gear.

9. The assembly as set forth in claim 1 wherein said bearing portion comprises spaced apart legs having C-shaped apertures aligned with one another, and wherein said first gear has a shaft portion received in said apertures, said shaft portion snap-fit into said apertures when in said assembled position.

10. The assembly as set forth in claim 9 wherein said portion of said first gear extending through said hole has an aperture adapted to drive the valve assembly.

11. The assembly as set forth in claim 1 wherein said actuator includes electrical contacts and said carrier includes receptacles for receiving said electrical contacts.

12. The assembly as set forth in claim 11 wherein said actuator is an DC electric motor.

13. The assembly as set forth in claim 1 wherein said mounting member comprises polypropylene.

14. The assembly as set forth in claim 1 wherein said carrier comprises polycarbonate.

15. A unitary electric motor carrier assembly for an actuator assembly, said carrier assembly comprising:
    a first gear for actuating the valve assembly;
    an actuator for driving said first gear;
    a second gear interposed between said actuator and said first gear with said second gear coupled to said first gear; and
    a cradle portion supporting said actuator and a bearing portion integrally formed with said cradle portion, said bearing portion supporting said first gear, said cradle and bearing portions aligning said first and second gears with one another.

16. The assembly as set forth in claim 15 wherein said bearing portion comprises spaced apart legs having C-shaped apertures aligned with one another, and wherein said first gear has a shaft portion received in said apertures, said shaft portion snap-fit into said apertures when in said assembled position.

17. The assembly as set forth in claim 15 wherein said carrier comprises polycarbonate.

18. The assembly as set forth in claim 15 wherein said actuator includes electrical contacts and said carrier includes receptacles for receiving said electrical contacts.

* * * * *